(12) United States Patent
Johnson et al.

(10) Patent No.: US 7,496,935 B2
(45) Date of Patent: Feb. 24, 2009

(54) ROTARY INFORMATION DEVICE FOR REMOVABLE MEDIA

(75) Inventors: James W. Johnson, Tucson, AZ (US); David M. Davis, Tucson, AZ (US); Nils Haustein, Zornheim (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 11/038,655

(22) Filed: Jan. 19, 2005

(65) Prior Publication Data

US 2006/0161935 A1 Jul. 20, 2006

(51) Int. Cl.
 *G11B 23/02* (2006.01)
(52) U.S. Cl. .................. 720/645; 720/728
(58) Field of Classification Search ............. 720/645, 720/728, 734; 369/291.1
See application file for complete search history.

(56) References Cited

U.S. PATENT DOCUMENTS

| | | | | | |
|---|---|---|---|---|---|
| 3,507,501 | A | * | 4/1970 | Lear | ............... 360/78.02 |
| 3,617,067 | A | * | 11/1971 | Ban | ............... 360/132 |
| 3,699,266 | A | * | 10/1972 | Lemelson | ............... 360/92.1 |
| 4,001,891 | A | * | 1/1977 | Held | ............... 360/132 |
| 4,079,431 | A | * | 3/1978 | Marut | ............... 360/132 |
| 4,660,172 | A | * | 4/1987 | Holzer | ............... 365/2 |
| 4,907,902 | A | * | 3/1990 | Doi | ............... 400/249 |
| 5,055,947 | A | * | 10/1991 | Satoh | ............... 360/62 |
| 5,218,342 | A | * | 6/1993 | McCrackin | ............... 340/572.8 |
| 5,859,755 | A | | 1/1999 | Griffin et al. | |
| 6,065,701 | A | * | 5/2000 | Tanimura et al. | ............... 242/344 |
| 6,215,760 | B1 | | 4/2001 | Hanakawa et al. | |
| 6,304,416 | B1 | * | 10/2001 | McAllister et al. | ............... 360/132 |
| 6,476,999 | B1 | | 11/2002 | Meikle et al. | |
| 6,577,471 | B1 | * | 6/2003 | Morita et al. | ............... 360/132 |
| 6,772,430 | B2 | | 8/2004 | Oishi et al. | |
| 6,817,563 | B2 | * | 11/2004 | Iino | ............... 242/348 |
| 6,958,887 | B2 | * | 10/2005 | Hiraguchi | ............... 360/132 |
| 7,064,923 | B2 | * | 6/2006 | Tran et al. | ............... 360/99.08 |
| 7,240,825 | B2 | * | 7/2007 | Tada | ............... 235/375 |

* cited by examiner

*Primary Examiner*—Brian E Miller
*Assistant Examiner*—Adam B Dravininkas
(74) *Attorney, Agent, or Firm*—Quarles & Brady LLP

(57) ABSTRACT

A rotary switch rotates about an axis which is at acute angles to a lower cartridge surface and a cartridge end so that a first display surface and a second display surface may be independently accessed by disparate components residing in disparate planes. The display surfaces are generally orthogonal to each other and can have multiple facets, with each facet containing a subset of information. To aid this optical interrogation, the display surfaces may be generally orthogonal to the disparate interrogating components.

27 Claims, 11 Drawing Sheets

ROTARY INFORMATION DEVICE FOR REMOVABLE MEDIA

BACKGROUND OF THE INVENTION

1. Field of the Invention

The invention is related in general to removable media cartridges, such as tape, optical, DVD, flash memory, or hard disk drive cartridges. More particularly, the invention consists of a generally cylindrically shaped rotary switch which is at an acute angle to two planes of the removable media cartridge or a generally cone shaped rotary switch which is perpendicular to a plane of the removable media cartridge, so that the switch can be simultaneously read by two disparate system components.

2. Description of the Prior Art

Storage automation products, such as the IBM 3584 Ultra Scalable Tape Library, provided by International Business Machines ("IBM")®, include removable media such as tape cartridges, one or more robotic accessors ("pickers"), one or more devices for reading from and writing to the removable media such as tape drives, and a plurality of storage cells for holding the removable media. Typically, removable media include a switch that indicates whether the media can be written to or if the media has been designated as write-protect. This switch is usually accessed by a component of the tape drive.

A static switch, such as a single flat surface, can provide only a limited amount of information, as dictated by the physical dimension of the flat surface. It is desirable to increase kinds and amount of information that may be contained on a switch. Therefore, it is desirable to increase the surface area of a switch in order to increase the amount of information that may be obtained. Accordingly, it is desirable to have a non-static switch that can dynamically provide information related to the removable media.

In U.S. Pat. No. 5,859,755, Griffin et al. disclose a rotary switch that rotates about an axis. This rotary switch allows for the dynamic display of information on a dynamic display surface. As taught by Griffin, the surface of the switch is parallel to the plane of the tape. Other devices, such as pickers, may also need information from the switch. These devices may reside in a plane other than the tape drive interrogator. Accordingly, it is desirable to have a surface of a switch for displaying information that may be simultaneously read by more than one device residing in more than one plane.

In U.S. Pat. No. 6,772,430, Oishi et al. disclose a rotary switch with a surface which is simultaneously accessible by two different components residing in two different planes. However, Oishi teaches that these two components are an optical source and a photodetector which are orthogonal to each other. Light travels from the source to the display surface and to the target (photodetector). However, it is desirable for two devices to simultaneously access the surface. To facilitate this, it would be desirable to have two disparate surfaces, each facing its respective interrogative device. Additionally, it would be desirable to have these surfaces perpendicular to their corresponding devices.

SUMMARY OF THE INVENTION

The present invention is a terraced rotary switch. When in the general shape of a cylinder, this switch rotates about an axis which is acute to two disparate planes so that it can be accessed or read independently by two different components residing in the two disparate planes. When in the general shape of a cone, this switch rotates about an axis which is perpendicular to a cartridge plane, so that it can be accessed independently by two different components residing in the two disparate planes. The rotary switch has a set of surfaces including a first surface that is generally orthogonal to the first component and a second surface that is generally orthogonal to the second component. Each surface may contain facets, with each facet containing a subset of information. Additionally, the rotary switch may include additional sets of surfaces, each set having either one or two disparate surfaces, which allows additional information to be stored on the switch. This additional information may include switches for individual partitions on the removable medium, cartridge capacity, cartridge vintage, or cartridge generation number. A removable media cartridge may have a cartridge memory which allows the storage and retrieval of information from the cartridge without having to access the medium inside of the cartridge as taught by U.S. Pat. No. 6,304,416, incorporated by reference.

Various other purposes and advantages of the invention will become clear from its description in the specification that follows and from the novel features particularly pointed out in the appended claims. Therefore, the present invention comprises the features hereinafter illustrated in the drawings, fully described in the detailed description of the preferred embodiments and particularly pointed out in the claims. However, such drawings and description disclose just a few of the various ways in which the invention may be practiced.

DETAILED DESCRIPTION OF THE PREFERRED EMBODIMENTS

The present invention is a rotary switch that is at acute angles from two cartridge surfaces so that it can be independently read by disparate components residing in planes generally orthogonal to the two surfaces. The rotary switch includes at least one set of two display surfaces that that may be accessed by two of the disparate components. The rotary switch may include additional sets of one or two display surfaces. Additionally, the display surfaces may have multiple facets, with each facet containing a subset of information. These information subsets may include the write protection of individual partitions on the removable medium, indications of cartridge capacity, cartridge vintage, or the generation number of the removable media cartridge.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
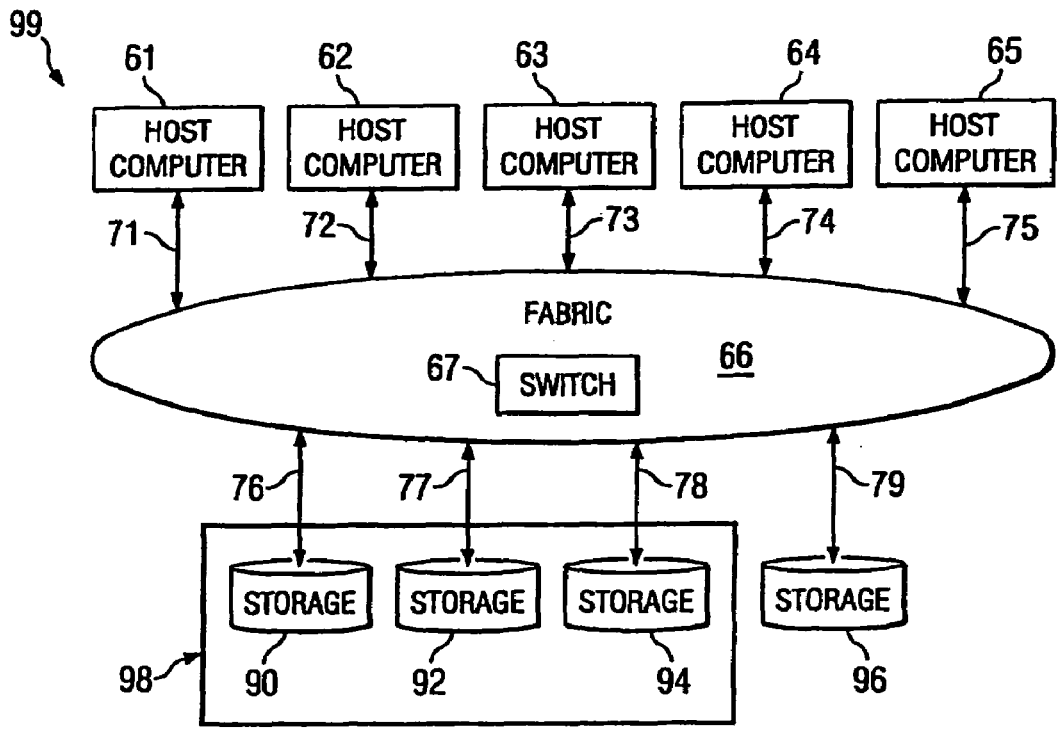
FIG. 1 is a block diagram illustrating aspects of an exemplary storage area network ("SAN").

Referring to figures, wherein like parts are designated with the same reference numerals and symbols, FIG. 1 is a block diagram that illustrates aspects of an exemplary storage area network ("SAN") 99, according to one embodiment of the present invention. The SAN 99 is designed as a switched-access-network, wherein switches 67 are used to create a switching fabric 66. In this embodiment of the invention, the SAN 99 is implemented using Small Computer Systems Interface (SCSI) protocol running over a Fibre Channel ("FC") physical layer. However, the SAN 99 could be implemented utilizing other protocols, such as Infiniband, FICON, TCP/IP, Ethernet, Gigabit Ethernet, or iSCSI. The switches 67 have the addresses of both the hosts 61, 62, 63, 64, 65 and storage units 90, 92, 94, 96.

Host computers 61, 62, 63, 64, 65 are connected to the fabric 66 utilizing I/O interfaces 71, 72, 73, 74, 75 respectively to fabric 66. I/O interfaces 71-75 may be any type of I/O interface; for example, a FC loop, a direct attachment to fabric 66 or one or more signal lines used by host computers 71-75 to transfer information respectfully to and from fabric 66. Fabric 66 includes, for example, one or more FC switches 67 used to connect two or more computer networks. In one embodiment, FC switch 67 is a conventional router switch.

Switch 67 interconnects host computers 61-65 to storage 90, 92, 94, and 96 across respective I/O interfaces 76-79. I/O interfaces 76-79 may be any type of I/O interface, for example, a Fibre Channel, Infiniband, Gigabit Ethernet, Ethernet, TCP/IP, iSCSI, SCSI I/O interface or one or more signal lines used by FC switch 67 to transfer information respectfully to and from storage 90, 92, 94, and 96. In the example shown in FIG. 1, storage 90, 92, and 94 are stored within automated storage library 98, and storage 96 is network attached storage ("NAS").

Figure 2:
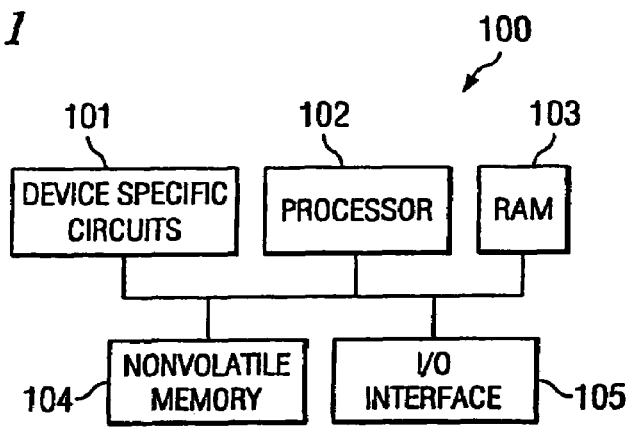
FIG. 2 is a block diagram of a library controller.

An automated data storage library typically comprises one or more controllers to direct the operation of the library. The controller may take many different forms and may include an embedded system, a distributed control system, a personal computer, workstation, etc. FIG. 2 shows a typical library controller 100 with a processor 102, random access memory ("RAM") 103, nonvolatile memory 104, device specific circuits 101, and an I/O interface 105.

Alternatively, the RAM 103 and/or nonvolatile memory 104 may be contained in the processor 102 as well as the device specific circuits 101 and I/O interface 105. Processor 102 may include an off-the-shelf microprocessor, custom processor, FPGA, ASIC, or other form of discrete logic. RAM 103 is typically used to hold variable data, stack data, executable instructions, etc. The nonvolatile memory 104 may comprise any type of nonvolatile memory such as Electrically Erasable Programmable Read Only Memory ("EEPROM"), flash Programmable Read Only Memory ("PROM"), battery backup RAM, hard disk drive, or other similar device.

The nonvolatile memory 104 is typically used to hold the executable firmware and any nonvolatile data. I/O interface 105 comprises a communication interface that allows processor 102 to communicate with devices external to the controller. Examples of I/O interface 105 include serial interfaces such as RS-232 or USB (Universal Serial Bus), SCSI (Small Computer Systems Interface), Fibre Channel, etc. In addition, I/O interface 105 may comprise a wireless interface such as radio frequency ("RF") or Infrared. The device specific circuits 101 provide additional hardware to enable the controller 100 to perform unique functions such as motor control of a cartridge gripper, etc.

Device specific circuits 101 may comprise electronics that provide Pulse Width Modulation (PWM) control, Analog to Digital Conversion (ADC), Digital to Analog Conversion (DAC), etc. In addition, all or part of the device specific circuits 101 may reside outside controller 100.

Figure 3:
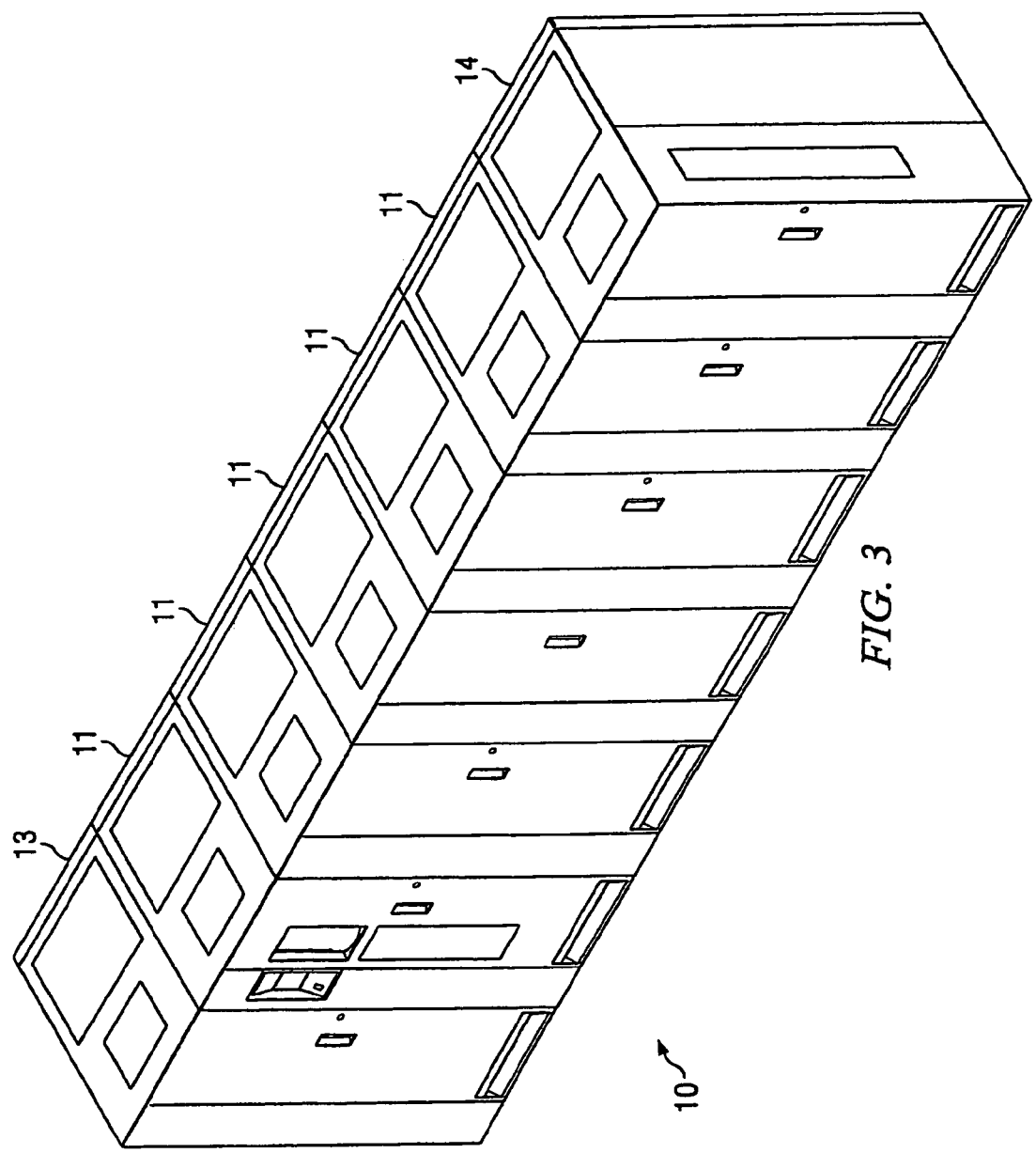
FIG. 3 is an illustration of an automated data storage library including a left hand service bay, multiple storage frames, and a right hand service bay.

FIG. 3 illustrates an automated data storage library 10 with left hand service bay 13, one or more storage frames 11, and right hand service bay 14. A frame may include an expansion component to the library. Frames may be added or removed to expand or reduce the size and/or functionality of the library. Frames may also include storage shelves, drives, import/export stations, accessors, operator panels, etc.

Figure 4:
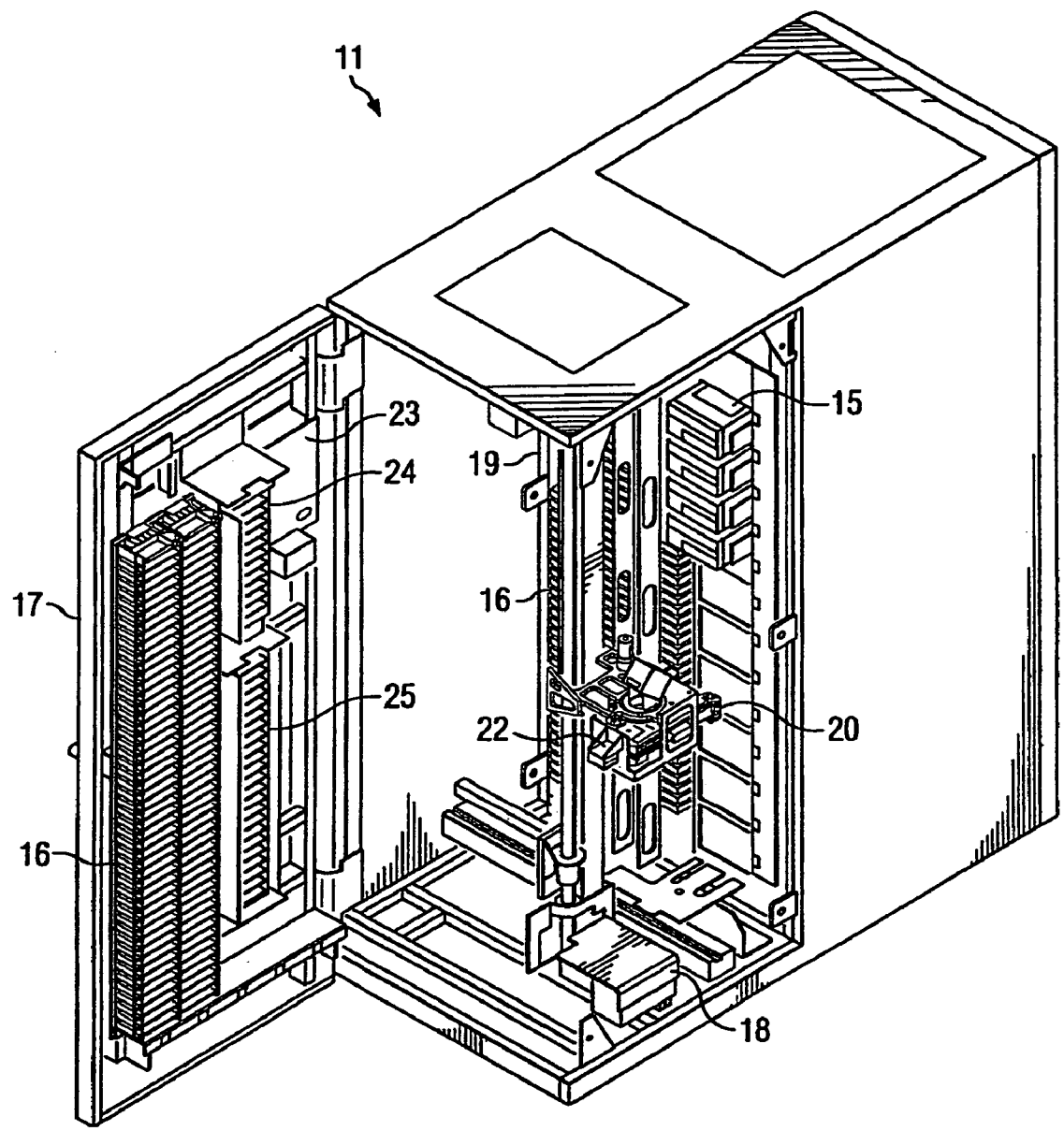
FIG. 4 is an illustration of internal components of the automated data storage library of FIG. 3.

FIG. 4 shows an example of a storage frame 11, a configuration of the library 10 in FIG. 3. In this configuration, the library is arranged for accessing data storage media (not shown) in response to commands from at least one external host system (not shown), and comprises a plurality of storage shelves 16, on front wall 17 and rear wall 19, for storing data storage cartridges that contain data storage media; at least one data storage drive 15 for reading and/or writing data with respect to the data storage media; and a first accessor 18 for transporting the data storage media between the plurality of storage shelves 16 and the data storage drives 15. The storage frame 11 may optionally comprise an operator panel 23 or other user interface, such as a web-based interface, which allows a user to interact with the library.

The storage frame 11 may also include an upper I/O station 24 or a lower I/O station 25, which allows data storage media to be inserted into the library and/or removed from the library without disrupting library operation. Additionally, the library 10 may contain one or more storage frames 11, each having storage shelves 16 accessible by first accessor 18. As described above, the storage frames 11 may be configured with different components depending upon the intended function.

One configuration of storage frame 11 may comprise storage shelves 16, data storage drives 15, and other optional components to store and retrieve data from the data storage cartridges. The first accessor 18 includes a gripper assembly 20 for gripping one or more data storage media and may also include a bar code scanner 22 or reading system, such as a smart card reader or similar system, mounted on the gripper 20, to read or write identifying information about the data storage medium to a cartridge memory.

Figure 5:
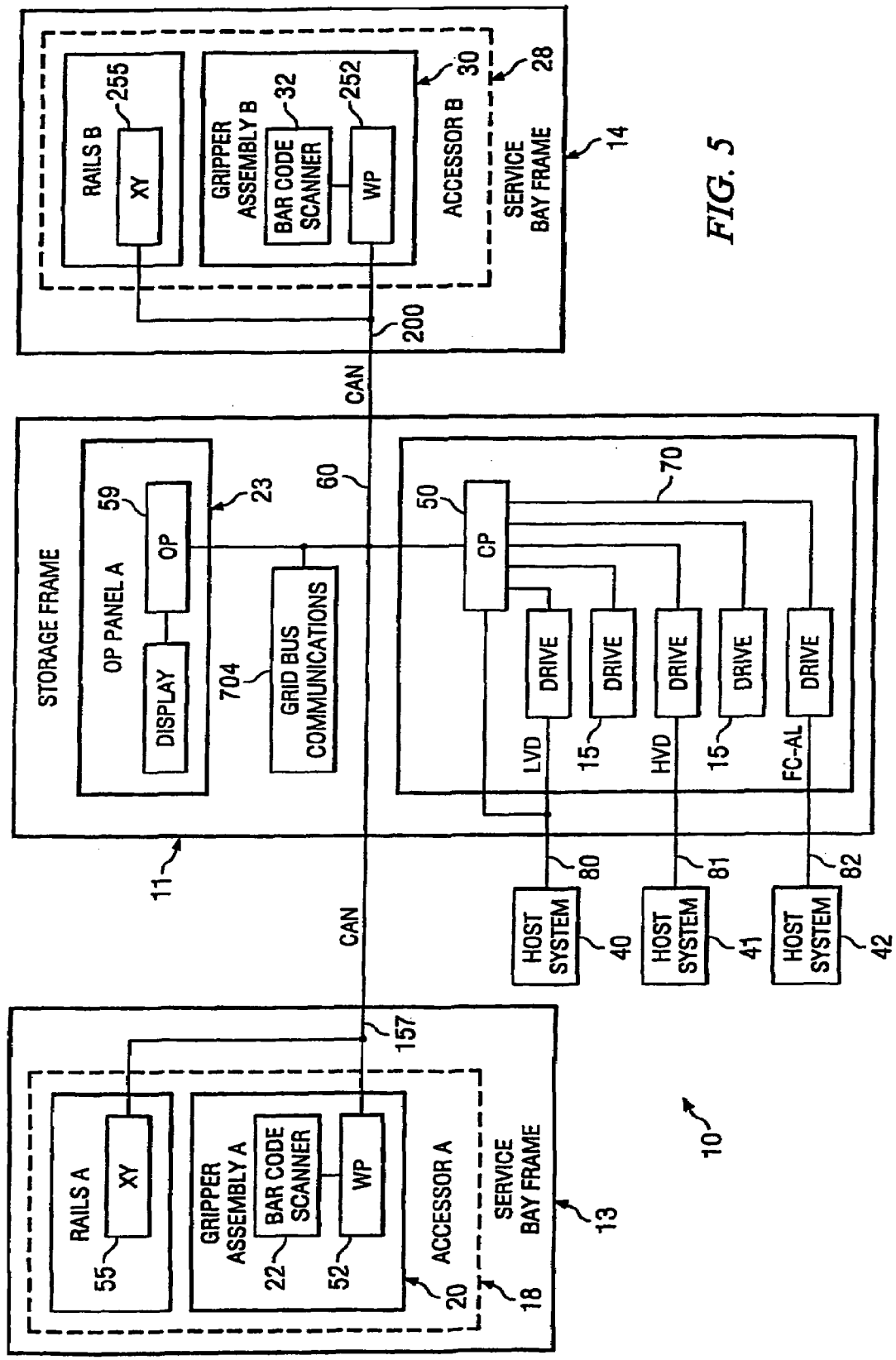
FIG. 5 is a block diagram illustrating an embodiment of an automated data storage library which includes a distributed system of processor nodes.

FIG. 5 illustrates internal components of the automated data storage library 10 of FIGS. 3 and 4, employing a distributed system of modules with a plurality of processor nodes. An example of an automated data storage library which may implement the present invention is the IBM 3584 UltraScalable Tape Library®. While the library 10 has been described as a distributed control system, this invention applies equally to libraries that incorporate other control configurations such as one or more library controllers that are not distributed. The library of FIG. 5 includes one or more storage frames 11, a left hand service bay 13 and a right hand service bay 14.

The left hand service bay 13 is shown with a first accessor 18. As discussed above, the first accessor 18 includes a gripper assembly 20 and may include a reading system 22 to read or write identifying information about the data storage medium to a cartridge memory. The right hand service bay 14 is shown with a second accessor 28. The second accessor 28 includes a gripper assembly 30 and may include a reading system 32 to read or write identifying information about the data storage media, for example, to a cartridge memory. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. In addition, the present invention may operate with fewer or more than two accessors.

In the exemplary library, the first accessor 18 and the second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15. The exemplary library 10 receives commands from one or more host systems 40, 41, 42 or for example, hosts 61-65 shown in FIG. 1. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 (FIG. 4) and the data storage drives 15. The commands are typically logical commands identifying the media and/or logical locations for accessing the media.

The exemplary library is controlled by a distributed control system receiving the logical commands from hosts, determining the required actions, and converting the actions to physical movements of first accessor 18 and/or second accessor 28.

In the exemplary library, the distributed control system includes a plurality of processor nodes 50, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18 and that is coupled to the communication processor node 50 via a network 60, 157. A second work processor node 252 that may be located at second accessor 28 and that is coupled to the communication processor node 50 via a network 60, 200 may also be provided. Each work processor node may respond to received commands that are broadcast to the work processor nodes from any communication processor node, and the work processor node may also direct the operation of first accessor 18, providing move commands. An XY processor node 55 may be provided and may be located at an XY system of first accessor 18. The XY processor node 55 is coupled to the network 60, 157, and is responsive to the move commands, operating the XY system to position the gripper 20. Similarly, an XY processor node 255 may be provided and may be located at an XY system of second accessor 28. The XY processor node 255 is coupled to the network 60.

Also, an operator panel processor node 59 may be provided at the optional operator panel 23 for providing an interface for communicating between the operator panel and the communication processor node 50, the work processor node 52, and the XY processor node 55.

A network, with a common bus 60, is provided, coupling the various processor nodes. The network may include a robust wiring network, such as the commercially available Controller Area Network ("CAN") bus system, which is a multi-drop network, having a standard access protocol and wiring standards, for example, as defined by the CAN in Automation Association ("CiA"). Other networks, such as Ethernet, or wireless network systems, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host systems with a library interface similar to the drive/library interface. As is known to those of skill in the art, various communication arrangements may be employed for communication with the hosts and with the data storage drives. In the example of FIG. 5, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as fibre channel or RS-422. The data storage drives 15 are thus individually coupled to the communication processor node 50 by means of lines 70. Alternatively, the data storage drives 15 may be coupled to the communication processor node 50 through one or more networks, such as a common bus network.

Also in FIG. 5, a grid bus communications 704 is connected to the communication processor node 50 via a network 60. Through communication processor node 50, hosts 40-42 can communicate with grid bus communications 704. Referring to both FIG. 5 and FIG. 7, hosts 40-42 and/or communication processor node 50 can wirelessly query the cartridge memory 703 of removable storage media 700 in storage slots 16. These queries may involve auditing the storage media in the storage slots, to insure that the map of the locations of the storage media in the storage slots is correct. This map of the locations of the storage media is important so that accessors 18 and 28 can go directly to the desired storage slot. This query may also include auditing the status of cleaner cartridges in storage slots 16.

Additional storage frames 11 may be provided and each is coupled to the adjacent storage frame. Any of the storage frames 11 may comprise communication processor nodes 50, storage shelves 16, data storage drives 15, and networks 60.

In FIG. 5 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 6:
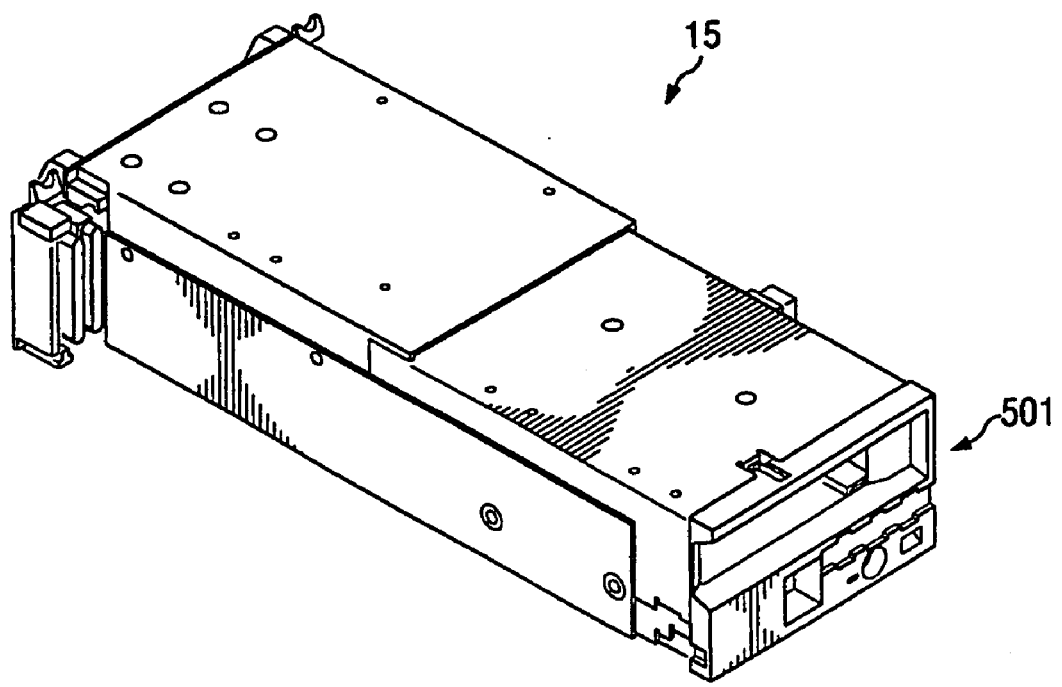
FIG. 6 is an illustration of a front and rear view of a data storage drive mounted in a drive canister.
Figure 6:
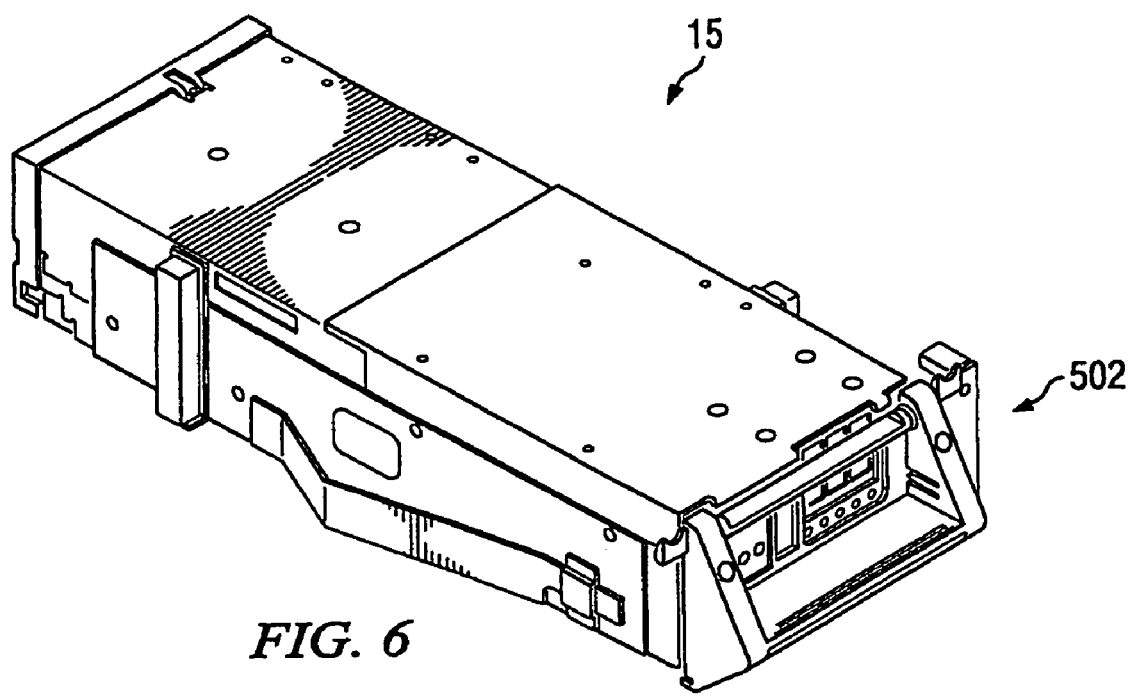

FIG. 6 shows a view of the front 501 and rear 502 of drive 15. In this example, drive 15 is a removable media LTO (Linear Tape Open) tape drive mounted in a drive canister. The drive canister may comprise a housing to hold drive 15, mounting means to attach drive 15 to the drive canister, electrical components, interface cables, interface connectors, etc. The data storage drive of this invention may comprise any removable media drive such as magnetic or optical tape drives, magnetic or optical disk drives, electronic media drives, or any other removable media drive as is known in the art.

Figure 7:
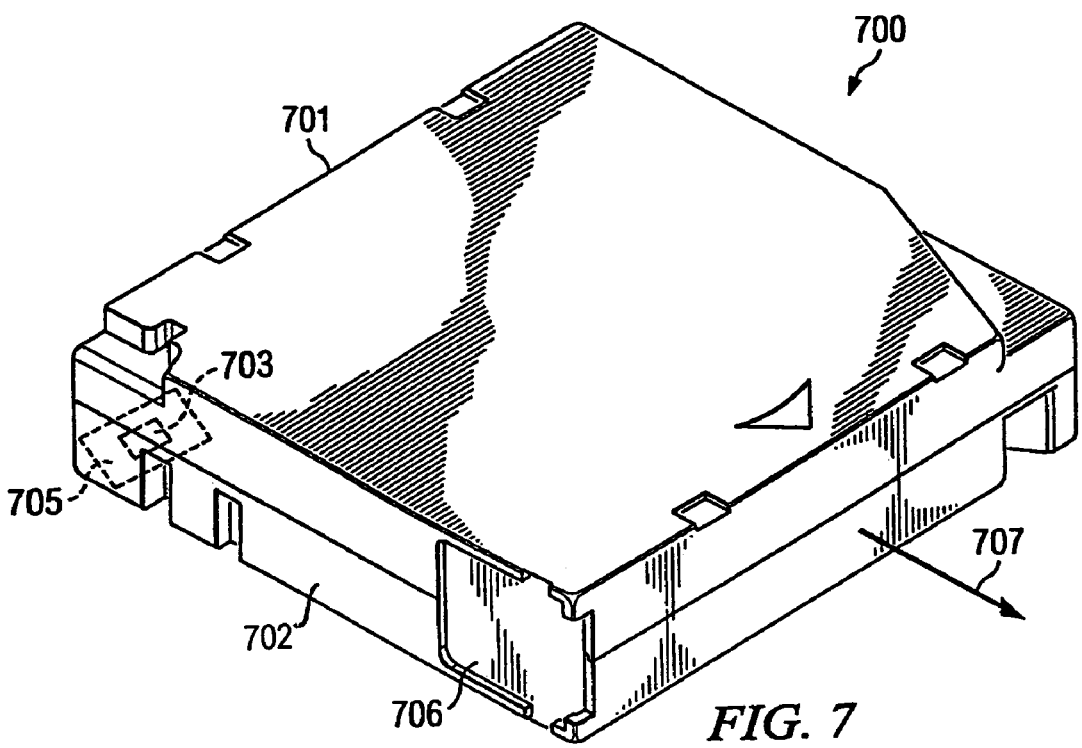
FIG. 7 is an illustration of a tape cartridge.
Figure 8:
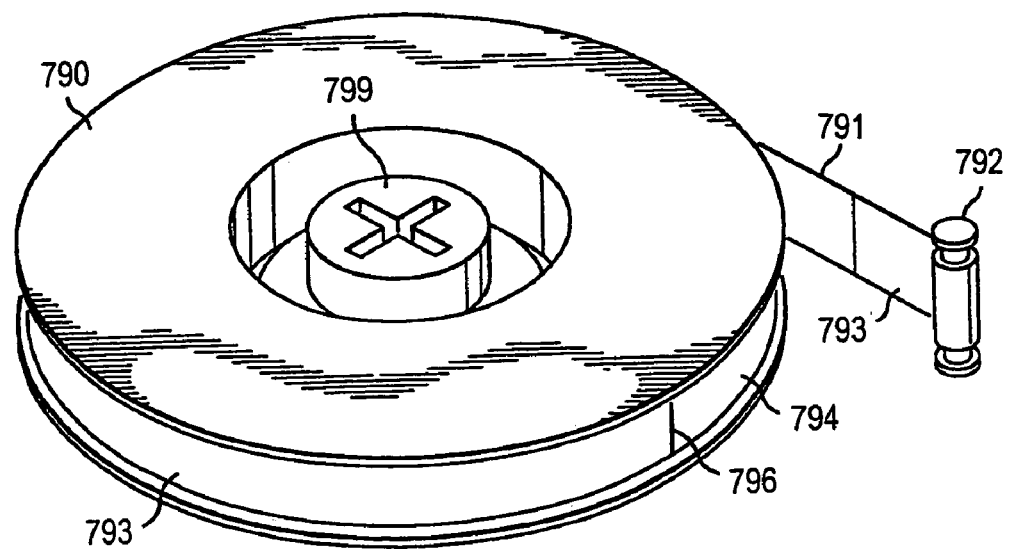
FIG. 8 illustrates a reel of tape contained in the tape cartridge of FIG. 7.

FIG. 7 shows an exemplary removable media cartridge, which is tape cartridge 700. Tape cartridge 700 includes upper cartridge-shell 701, lower cartridge-shell 702, and sliding door 706. Sliding door 706 is slid open when tape cartridge 700 is inserted into drive 15. Sliding door 706 is normally closed when tape cartridge 700 is not in use, so that debris and contaminants do not freely enter tape cartridge 700 and degrade tape 791, which is shown in FIG. 8. The direction that tape cartridge 700 is slid into drive 15 is shown as direction 707. Tape cartridge 700 also contains cartridge memory 703, which is on printed circuit board 705. Cartridge memory 703 is preferably at a 45 degree angle to the side of the cartridge and the bottom of the cartridge to allow drive 15, accessors 18 and 28, and grid bus communications 704 to wirelessly access the contents of cartridge memory 703. Alternate removable media cartridges are optical disk cartridges, where the optical media may be phase change media such as DVD-RAM (Digital Versatile Disk—Random Access Memory) or DVD-RW (DVD Read-Write) or DVD-R (DVD Write-Once), magneto-optical media, stamped media such as CD-ROM (Compact Disk—Read Only Memory) or DVD-ROM. Alternate removable media cartridges contain flash memory or hard disk drives. An exemplary removable media cartridge containing a hard disk drive is U.S. Pat. No. 6,545,865, which is hereby incorporated by reference in its entirety.

FIG. 8 shows exemplary tape reel 790, which is stored in tape cartridge 700. Tape reel 790 is prevented from rotation when tape cartridge 700 is not in drive 15 by brake-button 799. Drive 15 releases brake-button 799 via brake-button release 798 (FIG. 12) when tape cartridge 700 is inserted into drive 15, which then allows the free rotation of tape reel 790. Tape reel 790 is wound with tape 791.

Tape 791 preferably comprises a data section 794 of standard data tape. Tape 791 may include leader section 793 which is spliced to data section 794 at splice 796. Leader section 793 is typically more robust than data section 794, so to facilitate the threading of tape 791 through the tape path in drive 15. On the free end of tape 791 is leader pin 792. When tape cartridge 700 is slid into drive 15, sliding door 706 is opened, and tape drive 15 threads leader pin 792 and attached tape 791 through the tape path. Sliding door 706 is normally closed when tape cartridge 700 is not in use, so that external debris and contaminants do not freely enter tape cartridge 700 and degrade tape 791. An exemplary attachment of tape 791 to a threading pin 792 is taught by U.S. Pat. No. 6,003,802, which is hereby incorporated by reference in its entirety. One of ordinary skill in the art will recognize that the present invention may be used with media other than that shown in FIG. 7, for example, dual reel magnetic media or dual-sided single reel media.

Figure 9:
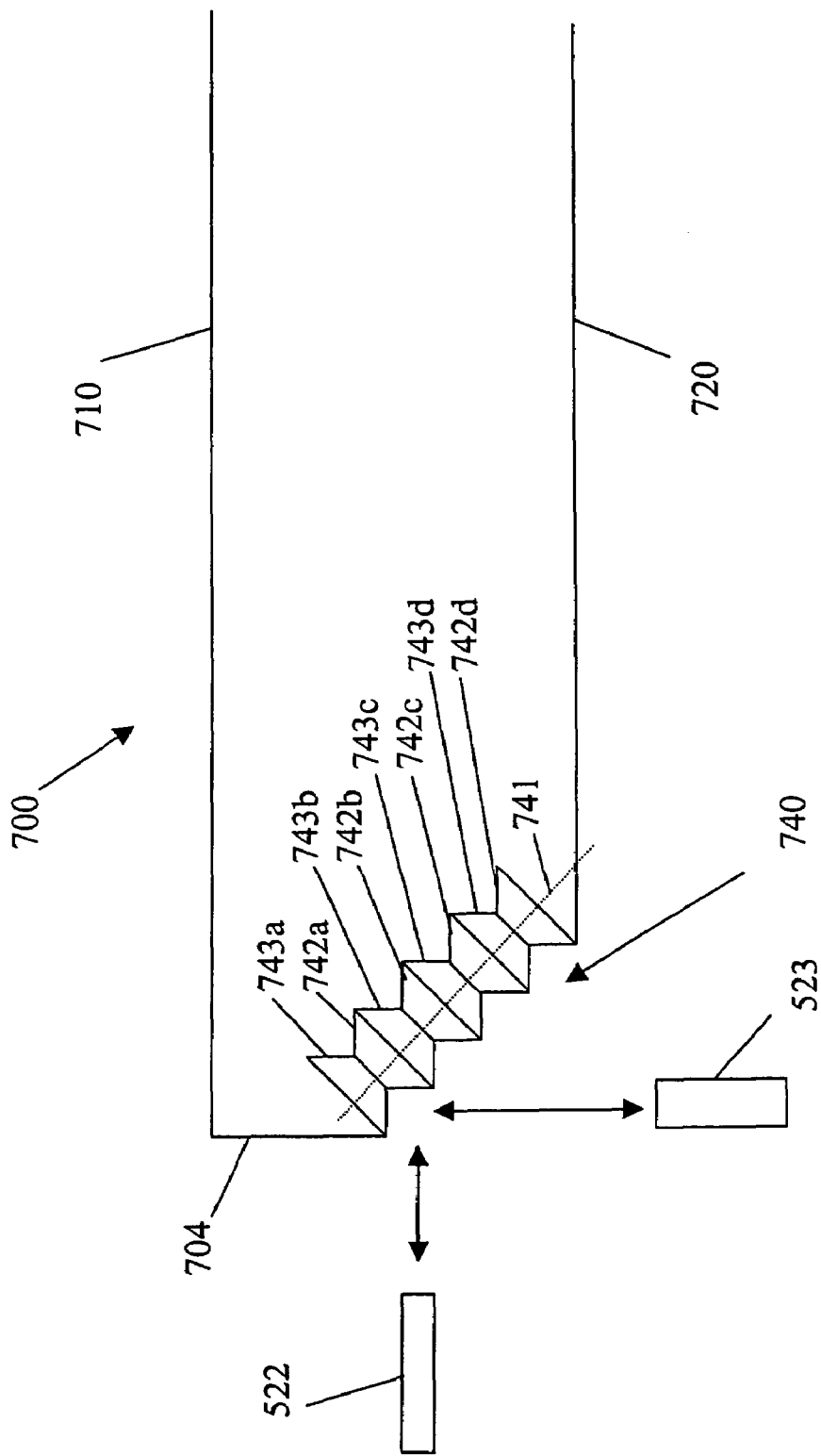
FIG. 9 is an illustration of a side-view of the tape cartridge of FIG. 7.

FIG. 9 shows a side view of tape cartridge 700. Tape cartridge 700 includes a top cartridge surface 710 and a lower cartridge surface 720, which encloses tape reel 790 (shown in FIG. 8). A first cartridge end 704 is partially cut away to expose rotary switch 740, which has axis of rotation 741 which is preferably at a 45 degree angle to the lower cartridge surface 720 and the first cartridge end 704.

Rotary switch 740 is terraced about its long axis 741, which creates display surfaces 742 and 743 which are perpendicular to each other. Additionally, display surfaces 742 are generally perpendicular to the first interrogating device 522, a light-emitting diode/photo-transistor ("LED/PTX"). The light from LED/PTX 522 reflects off of display surfaces 742 and back to LED/PTX 522. LED/PTX 522 is preferably mounted on accessors 18 and 28 of an automated storage library 10 (FIG. 5). Similarly, display surfaces 743 are generally perpendicular to another interrogating device 523 such as another LED/PTX. The light from the second LED/PTX 523 reflects off of display surfaces 743 and back to LED/PTX 523. LED/PTX 523 is preferably in drive 15 of automated storage library 10. In one embodiment of the invention, each pair of display surfaces 742-743 contain the same information, such as pair 742a-743a, pair 742b-743b, pair 742c-743c, and pair 742d-743d. For example, pair 742a-743a contains the same information on each surface 742a and 743a, so that accessor LED/PTX 522 reads the same information as drive LED/PTX 523. Pair 742b-743b also contain the same information, but typically contain different information than pair 742a-743a. In another embodiment of the invention, each display surface 742 may contain information disparate from or unassociated with any orthogonal display surface 743.

Respective surfaces 742 (742a, 742b, 742c, 742d) and 743 (743a, 743b, 743c, 743d) are orthogonal to each other, meaning that accessor LED/PTX 522 can read surfaces 742 (742a, 742b, 742c, 742d) but not 743 (743a, 743b, 743c, 743d). Similarly, drive LED/PTX 523 can read surfaces 743 (743a, 743b, 743c, 743d) but not 742 (742a, 742b, 742c, 742d).

In one embodiment of the present invention, display surfaces 742 (742a, 742b, 742c, 742d) and 743 (743a, 743b, 743c, 743d) are segregated into defined areas or zones. These defined areas are used to produce contrasting zones of reflectivity, including higher-reflective and lower-reflective zones, for interrogation by optical devices. Higher-reflective zones may indicate a logic high or a digital "1" and lower-reflective zones may indicate a logic low or a digital "0". Thus, a series of 1's and 0's representative of data may be encoded in each of the plurality of surfaces 742 and 743. While this embodiment of the invention discloses using one or more higher-reflective zones and one or more lower-reflective zones, varying degrees of reflectivity may be used in each type of zone, so long as a contrast exists between the two types of zones.

Different pairs of display surfaces may contain the same information so that the same information could be read from a multitude of disparate components such as accessors 18, 28 or drive 15 (FIG. 5). Given that there are multiple pairs of surfaces 742-743, one pair could contain the rewritable-write-protection selection, one pair or more pairs could contain information on tape generation or tape capacity, another pair could contain information on whether the cartridge was a data or a cleaner cartridge. Yet other pairs could identify the write-protect status of individual partitions within tape cartridge 700.

Figure 10:
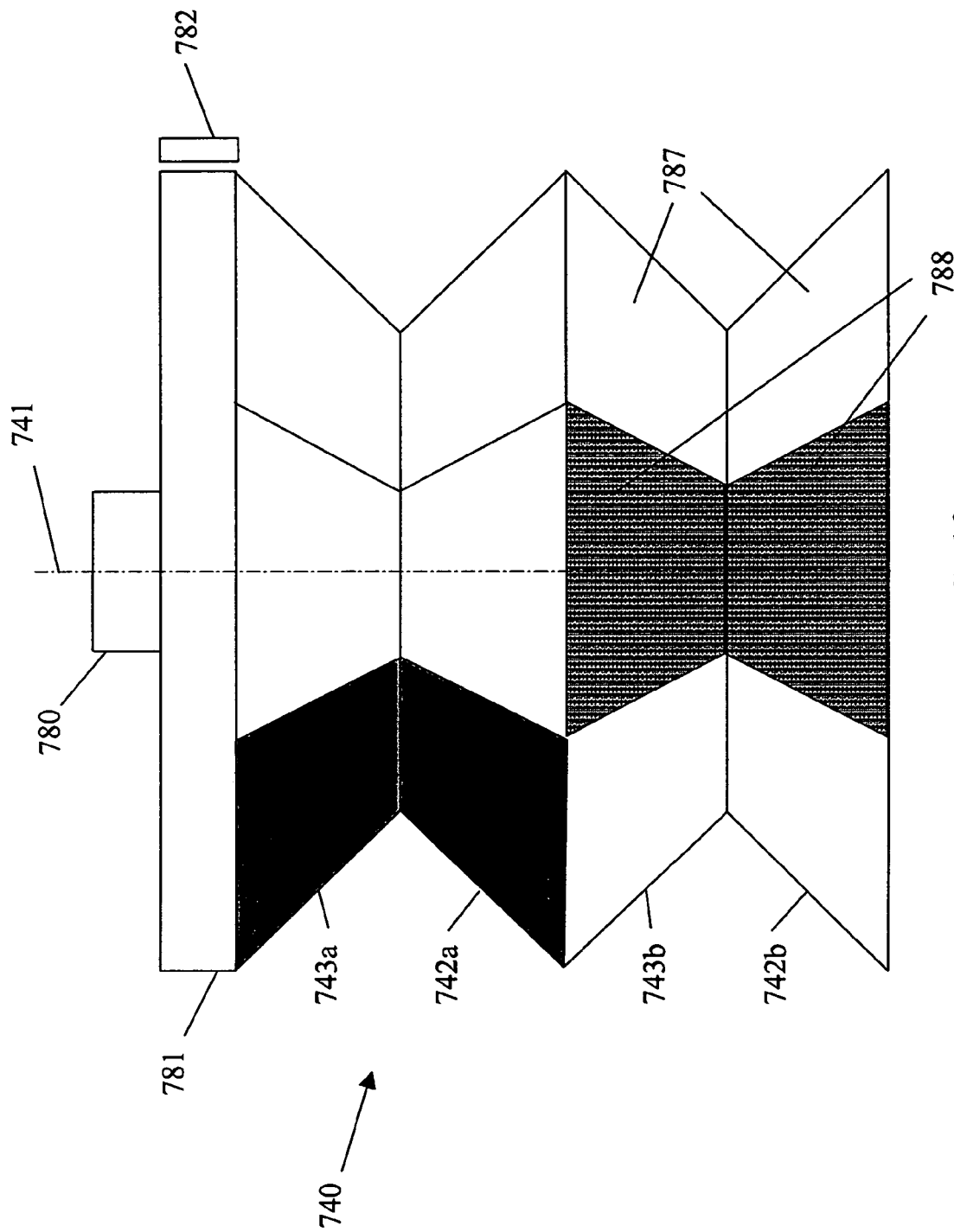
FIG. 10 is an illustration of a solid rotary switch having facets.
Figure 11:
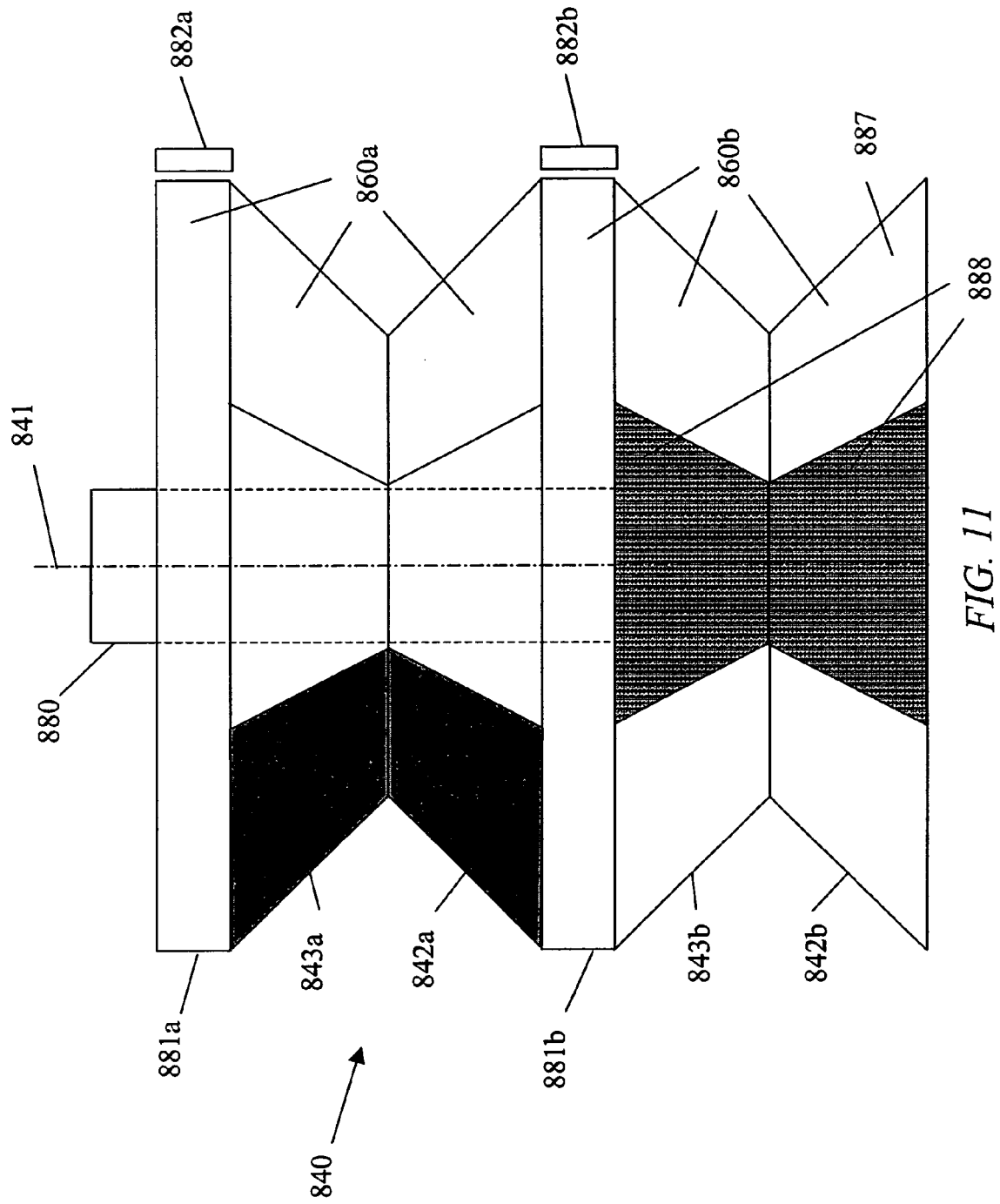
FIG. 11 is an illustration of a segmented rotary switch having facets.

FIGS. 10-11 are enlarged illustrations of the rotary switch 740, showing only a portion of the rotary switch 740 to allow for the display of detail. In FIG. 10, rotary switch 740 rotates as a solid body about axis of rotation 741 via shaft 780 at each end. Shaft 780 may be of the same material as the body of the rotary switch 740 or shaft 780 may be a nonmagnetic stainless-steel pin pressed into the body. Alternately, shaft 780 may be embedded in tape cartridge 700 and engage rotary switch 740 via a hole in each end of rotary switch 740.

Rotary switch 740 is shown as faceted in FIG. 10 to enhance the reflection of light off of surfaces intended to be read as reflective. Faced cylinder 781 is not terraced, so that leaf spring 782 can provide force to hold the rotary switch in its desired, user-selected position.

In this embodiment of the invention, display surfaces 742a and 742b are parallel to each other so that accessor LED/PTX 522 can read them individually. Similarly, 743a and 743b are parallel to each other so that drive LED/PTX 523 can read them individually. Display surfaces 742 and 743 are generally orthogonal to each other. Various facets of terraced faces 742 and 743 may include light facets 787 or dark facets 788. Information that may be encoded in this manner includes write protection information for the entire tape cartridge, write protection information for partitions of the tape cartridge, cartridge capacity, cartridge type, etc.

In FIG. 11, rotary switch 840 is segmented, so that individual segments 860a and 860b rotate independently about axis of rotation 841 via shaft 884 which passes through each segment 860a and 860b via a hole through the center of each segment 860a and 860b. Shaft 884 is preferably a nonmagnetic stainless-steel pin, or shaft 884 may be of the same material as segments 860a and 860b.

The rotary switch 840 includes facets to enhance the reflection of light off of surfaces intended to be read as reflective. Faceted cylinder 881a is not terraced, so that leaf spring 882a can provide force to hold the rotary switch segment 860a in its desired, independently-user-selected position. Faceted cylinder 881b is not terraced, so that leaf spring 882b can provide force to hold the rotary switch segment 860b in its desired, independently-user-selected position.

Surfaces 842a and 842b are parallel to each other so that accessor LED/PTX 522 can read them individually. Similarly, 843a and 843b are parallel to each other so that drive LED/PTX 523 can read them individually. Surfaces 842 and 843 are generally orthogonal to each other. Various facets may be either light facets 887 or dark facets 888.

Figure 12:
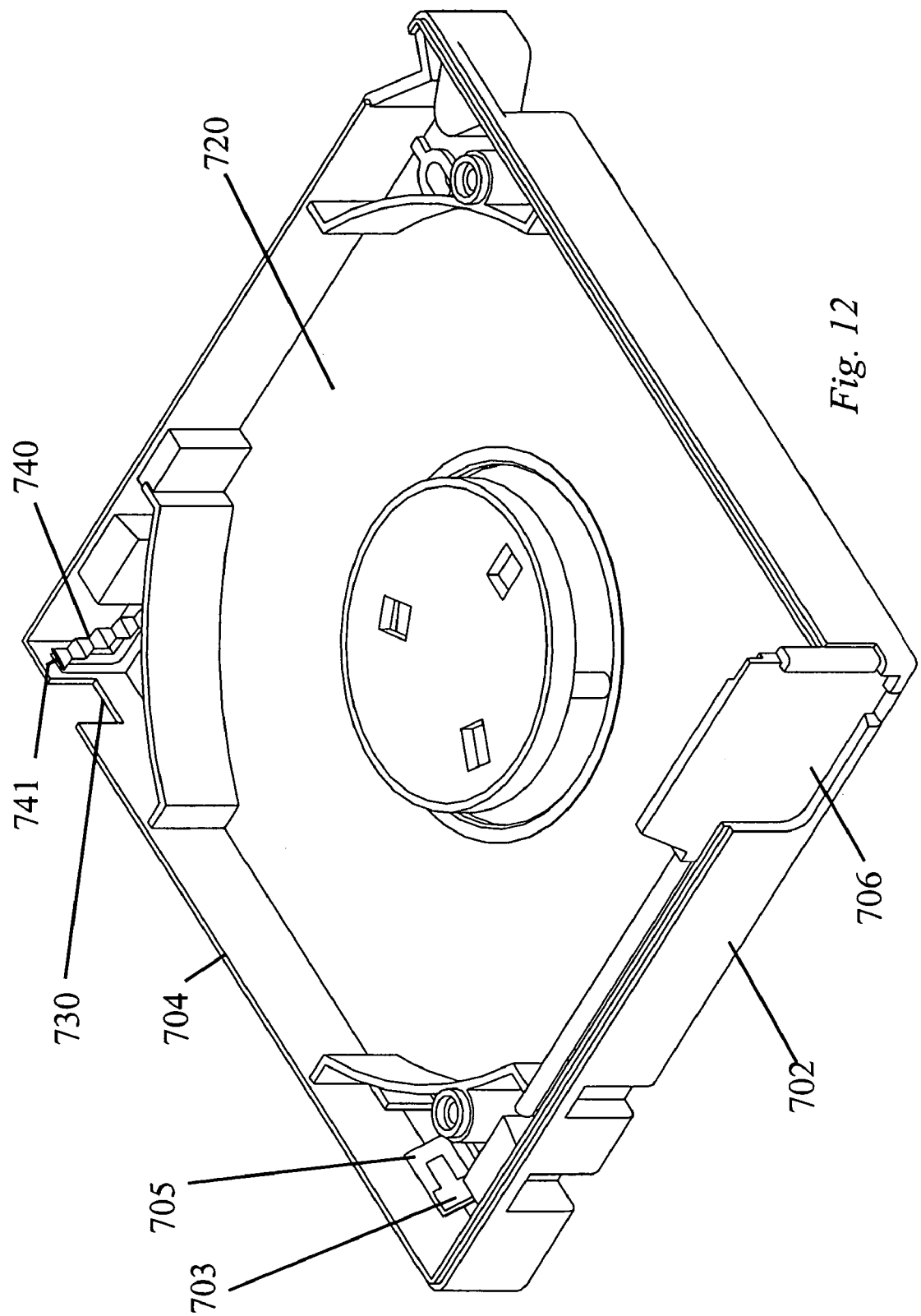
FIG. 12 is an illustration of a rotary switch in an isometric view of the interior of the cartridge shown in FIG. 7.

FIG. 12 shows an isometric view of lower cartridge-shell 702. Switch 740 is at a 45 degree angle to the lower cartridge surface 720 and the first cartridge end 704, the same as cartridge memory 703. Alternatively, the switch 740 may be replaced with the switch 840 of FIG. 11. This enables both the cartridge memory 703 and switch 740 to be read by either accessors 18, 28 or tape drive 15. Opening 730 is shown in cartridge end 704, which permits accessor LED/PTX 522 and drive LED/PTX 523 to have optical access to rotary switch 740. Opening 730 also allows user access to rotary switch, so that its setting can be changed as needed. FIG. 12 also shows brake-button release 798, which releases brake-button 799 to permit the free rotation of tape reel 790 when tape cartridge 700 is inserted into drive 15.

The rotary switch 740 can work at acute angles other than the 45 degree angle for the axis of rotation 741, shown in FIGS. 9 and 12. In other words, 45 degrees is the preferred angle for axis of rotation 741 for the rotary switch 740 in the cartridge 700. However, the rotary switch may be 30 degrees from the first cartridge end 704 and 60 degrees from the lower cartridge surface 720 or vice-versa. Adjacent display surfaces would remain orthogonal, and in this alternative embodiment, adjacent pairs of surfaces would form a 30-60 right-triangle. Each pair of surfaces would be rotated in an absolute sense relative the next pair of adjacent surfaces so that one surface is always perpendicular to drive LED/PTX 523 and the other (paired) face is always perpendicular to the accessor LED/PTX 522. As long as this perpendicularity is maintained relative to the respective LED/PTX 522 and 523, rotary switch 740 can be employed at angles of rotation other than 45 degrees.

Figure 13:
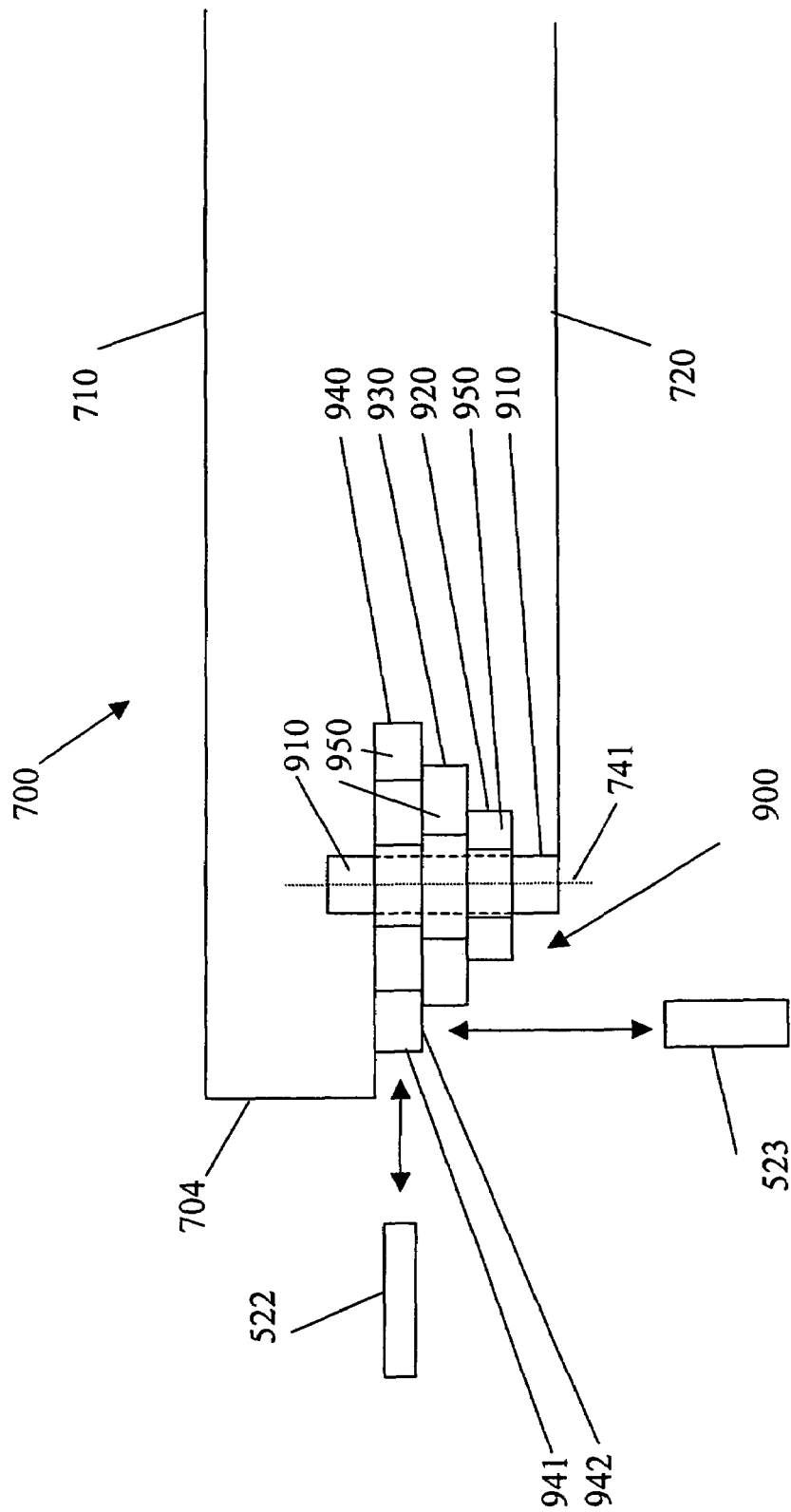
FIG. 13 is an illustration of an alternative rotary switch which presents a terraced surface via a cone-shaped structure.

FIG. 13 presents an alternative geometry for the same function of a rotary switch. Switch 900 is formed from one or more layers such as layers 920, 930, and 940, which produces a cone-like switch. Each of layers 920, 930, and 940 can rotate together or as independent segments about shaft 910 which is perpendicular to the lower cartridge surface 720 of cartridge 700, rather than at a 45 degree angle. Each of layers 920, 930, and 940 can have their outer circumferences faceted by facets 950. The number of facets in each of layers 920, 930, and 940 can vary if each of these layers can rotate as independent segments about shaft 910. These facets assist LED/PTX 522 in reading the settings on the circumference of switch 900. LED/PTX 523 reads settings on the flat surfaces of layers 920, 930, and 940, so no faceting is needed for LED/PTX 523. The circumferential surface of each layer and the flat surface of each layer contain the same information, i.e. circumference 941 and flat surface 942 contain the same information for layer 940. Layers 920, 930, and 940 are constrained by leaf springs 782 or 882 of FIGS. 10-11, so that layers 920, 930, and 940 cannot errantly deviate from the user-chosen settings.

Those skilled in the art of removable media cartridges may develop other embodiments of the present invention. The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow.

We claim:

1. A removable media comprising:
 a cartridge having a lower cartridge surface and a cartridge end; and
 a rotary switch including an axis of rotation and a first pair of display surfaces, said first pair of display surfaces including a first display surface arranged so that it may be accessed from the cartridge end and a second display surface arranged so that it may be accessed from the lower cartridge surface,
 wherein the axis of rotation is adapted to incline at a first acute angle from the lower cartridge surface and at a second acute angle from the cartridge end.

2. The removable media of claim 1, wherein the second display surface is perpendicular to the first display surface.

3. The removable media of claim 2, wherein the first display surface is perpendicular to the cartridge end.

4. The removable media of claim 3, wherein the second display surface is perpendicular to the lower cartridge surface.

5. The removable media of claim 1, wherein the first display surface is adapted to be accessed by a photo-transistor.

6. The removable media of claim 5, wherein the first display surface includes a plurality of contrasting zones of reflectivity.

7. The removable media of claim 6, wherein the plurality of contrasting zones of reflectivity are adapted to represent information.

8. The removable media of claim 1, wherein the second display surface is adapted to be accessed by a photo-transistor.

9. The removable media of claim 1, wherein the first display surface is adapted to include a first set of information and the second display surface is adapted to include the first set of information.

10. The removable media of claim 1, further comprising a second pair of display surfaces, said second pair of display surfaces including a third display surface arranged so that it may be accessed from the cartridge end and a fourth display surface arranged so that it may be accessed from the lower cartridge surface.

11. The removable media of claim 10, wherein the first pair of display surfaces is adapted to rotate about the axis of rotation independent of the second pair of display surfaces.

12. The removable media of claim 1, further comprising a third display surface arranged so that it may be accessed from the cartridge end.

13. The removable media of claim 12, wherein the third display surface is adapted to include a first set of information and the second display surface is adapted to include the first set of information.

14. The removable media of claim 1, wherein the first acute angle is equivalent to the second acute angle.

15. The removable media of claim 1, wherein the lower cartridge surface is perpendicular to the cartridge end and the first acute angle and the second acute angle are forty-five degrees.

16. The removable media of claim 1, wherein the lower cartridge surface is perpendicular to the cartridge end and the axis of rotation is parallel to the cartridge end and is perpendicular to the lower cartridge surface.

17. The removable media of claim 1, wherein the lower cartridge surface is perpendicular to the cartridge end and the axis of rotation is perpendicular to the cartridge end and is parallel to the lower cartridge surface.

18. The removable media of claim 1, wherein the first display surface includes a plurality of facets.

19. The removable media of claim 18, wherein a first one of the plurality of facets includes a higher-reflective zone and a second one of the plurality of facets includes a lower-reflective zone.

20. A method of reading information from a removable media having a rotary switch including an axis of rotation and a first pair of display surfaces, said first pair of display surfaces including a first display surface and a second display surface, comprising the steps of:
    arranging the first display surface so that it may be accessed from a cartridge end of a cartridge containing the rotary switch; and
    arranging the second display surface so that is may be accessed from a lower cartridge surface of the cartridge,
    wherein the axis of rotation is inclined at a first acute angle from the cartridge end and at a second acute angle from the lower cartridge surface.

21. The method of claim 20, wherein the first display surface and the second display surface are perpendicular to each other.

22. The method of claim 20, wherein the axis of rotation is perpendicular to the lower cartridge surface.

23. The method of claim 20, wherein the axis of rotation is perpendicular to the cartridge end.

24. A storage library, comprising:
    a processor;
    a gripper assembly coupled to the processor;
    at least one storage bin for holding a tape cartridge; and
    at least one tape cartridge configured to reside within the storage bin, said tape cartridge having a rotary switch, wherein the rotary switch comprises a first pair of display surfaces, said first pair of display surfaces including a first display surface arranged so that it may be accessed from the cartridge end and a second display surface arranged so that it may be accessed from the lower cartridge surface,
    wherein the axis of rotation is inclined at a first acute angle from the cartridge end and at a second acute angle from the lower cartridge surface.

25. The storage library of claim 24, wherein the first display surface and the second display surface are perpendicular to each other.

26. The storage library of claim 24, wherein the axis of rotation is perpendicular to the lower cartridge surface.

27. The storage library of claim 25, wherein the axis of rotation is perpendicular to the cartridge end.

* * * * *